United States Patent [19]

Maupillier et al.

[11] Patent Number: 5,450,323
[45] Date of Patent: Sep. 12, 1995

[54] COMMAND SYSTEM WITH INTERACTIVE COMMAND SOURCES, ENABLING ANY NUMBER OF HETEROGENEOUS SYSTEMS TO BE ACCESSED

[75] Inventors: Didier Maupillier, Merville; Cédric D'Silva, Fontenay Le Fleury; Georges Simon, Wissous, all of France

[73] Assignees: Aerospatiale — Societe Nationale Industrielle, Paris; Sextant Avionique, Meudon La Foret, both of France

[21] Appl. No.: 77,340

[22] Filed: Jun. 17, 1993

[30] Foreign Application Priority Data

Jun. 18, 1992 [FR] France ................... 92 07407

[51] Int. Cl.⁶ ............................................. G06F 3/02
[52] U.S. Cl. ............................ 364/424.06; 345/173; 364/189
[58] Field of Search ............... 364/434, 424.06, 131, 364/188, 189, 135; 340/972, 973; 395/155, 161; 345/173

[56] References Cited

U.S. PATENT DOCUMENTS

| | | | |
|---|---|---|---|
| 4,422,180 | 12/1983 | Wendt | 455/603 |
| 4,587,630 | 5/1986 | Straton et al. | 364/900 |
| 4,845,495 | 7/1989 | Bollard et al. | 340/973 |
| 4,853,888 | 8/1989 | Lata et al. | 364/900 |
| 4,998,194 | 3/1991 | Okamoto et al. | 364/133 |
| 5,286,202 | 2/1994 | De Gyarfas et al. | 434/43 |

FOREIGN PATENT DOCUMENTS 0275192  1/1988  European Pat. Off. .
3700748  7/1988  Germany .

OTHER PUBLICATIONS

H. Heinson Hannover, *Benutzerfreundlichkeit moderner Kompaktregler...*, Automatisierungstechnische Praxis, vol. 6, Jun. 31, 1989, pp. 287–289.

Michael Dornheim, *Crew Situational Awareness Drives Avionics Developments,* Aviation Week and Space Technology, vol. 980, Jun. 1986.

Leonard G. Bekemeyer et al., *Flight Deck Avionics for the MD-11,* pp. 307–312. 7th Digital Avionics Systems Conference, Worthington Hotel, Fort Worth Tex., Oct. 13–16, 1986.

Primary Examiner—Michael Zanelli
Attorney, Agent, or Firm—Browdy and Neimark

[57] ABSTRACT

A command device which comprises a plurality of interactive command sources enabling any number of heterogeneous systems to be accessed, each command source being reconfigurable and having commands of a first type which cause the configuration of this source to change, and commands of a second type, specific to each of the configurations, and each system transmitting at the end of execution of the command information relating to the status of the system, on the one hand, perceptibly on the command sources situated in the configuration corresponding to the command that has just been executed, and, on the other hand, blindly in the memory spaces allocated to the command sources situated in other configurations. The invention applies notably to instrumentation in aerodyne cockpits.

8 Claims, 4 Drawing Sheets

COMMAND SYSTEM WITH INTERACTIVE COMMAND SOURCES, ENABLING ANY NUMBER OF HETEROGENEOUS SYSTEMS TO BE ACCESSED

BACKGROUND OF THE INVENTION

1. Field of the Invention

This invention relates to a command system with multiple interactive command sources, enabling any number of heterogeneous systems to be accessed.

It applies notably, though not exclusively, to the elaboration of the commands of the different systems of an aerodyne.

2. Description of the Prior Art

It is known that, inside the pilot's cockpit of a modern aerodyne, it is possible to use a multiplicity of command sources among which the following can be mentioned as examples:

multiplexed keyboards, respectively for the pilot, copilot and other crew members; these keyboards notably enable dialog with the flight management supervisor which computes the route to be followed in both the vertical plane and horizontal plane, and with the electronic visualization system.; this dialog can comprise the input or modification of the parameters associated with the piloting of the aerodyne (decision height, inclination of the aerodyne, barometric adjustment); modification of the modes for visualizing navigational data (ranges, elements visualized, radio beacons), and the choice of the housekeeping system page to be visualized;

a touch-sensitive surface associated with the flight management supervisor or with the different visualizing systems, notably for selecting a mode of visualization on the navigation screen (map, plan, compass dial, etc.);

the flight control unit which serves for the dialog with the automatic pilot on which the pilot displays e.g. his course or the speed select, ed.

In addition to these command sources, it is possible to envisage using vocal command means for both the pilot and copilot.

It so happens that the coexistence of all these command means separate from one another and situated in different places, is not very convenient for the pilot who must instinctively associate with each function both a system and the position of the corresponding command source. The pilot must of course also find, on the command sources, the real status of the system commanded. It should be specified that any part of the elements of a set (aircraft) is hereafter referred to by the term "system".

The choice of the corresponding breakdown is usually based on operational objectives.

It should be noted that it may refer to a system in the most commonplace meaning on an aircraft but also to a part of a system, or even to a group of parts of different systems.

OBJECT OF THE INVENTION

The main object of this invention is to remedy the preceding disadvantages by means of a command system enabling different heterogeneous systems to be commanded and using a plurality of reconfigurable command sources each having two types of command, i.e.

commands of a first type which cause the configuration of this source to change, each configuration being associated with a commanded system; and commands of a second type, specific to each of the configurations, and therefore to each of the commanded systems, enabling command messages to be transmitted to the commanded system in question.

SUMMARY OF THE INVENTION

The command system comprises a means for transmitting, among others at the end of execution of the command, information relating to the status of the commanded system (commanded system status word) for updating the display of the status of the commanded system, on the one hand, perceptibly on the command sources situated in the configuration corresponding to the command that has just been executed, and, on the other hand, blindly in the memory spaces allocated to the command sources situated in other configurations.

It is important to note that the term "display" covers all means enabling feedback of information to the operators.

By way of examples, this includes luminous displays, digital displays, graphical displays, audible messages, etc.

Advantageously, the reconfigurable command sources can consist of transparent touch-sensitive keyboards placed on reconfigurable display units.

However, the invention is not limited to such a solution: the command system can further comprise reconfigurable command sources, non-reconfigurable command sources such as e.g. code wheels which require, however, updating to the last value of the commanded variable.

BRIEF DESCRIPTION OF THE DRAWINGS

Other features and advantages of the invention will be clear from the embodiment described hereafter, by way of a non limiting example, with reference to the accompanying drawings in which.

DESCRIPTION OF THE PREFERRED EMBODIMENTS

Figure 1:
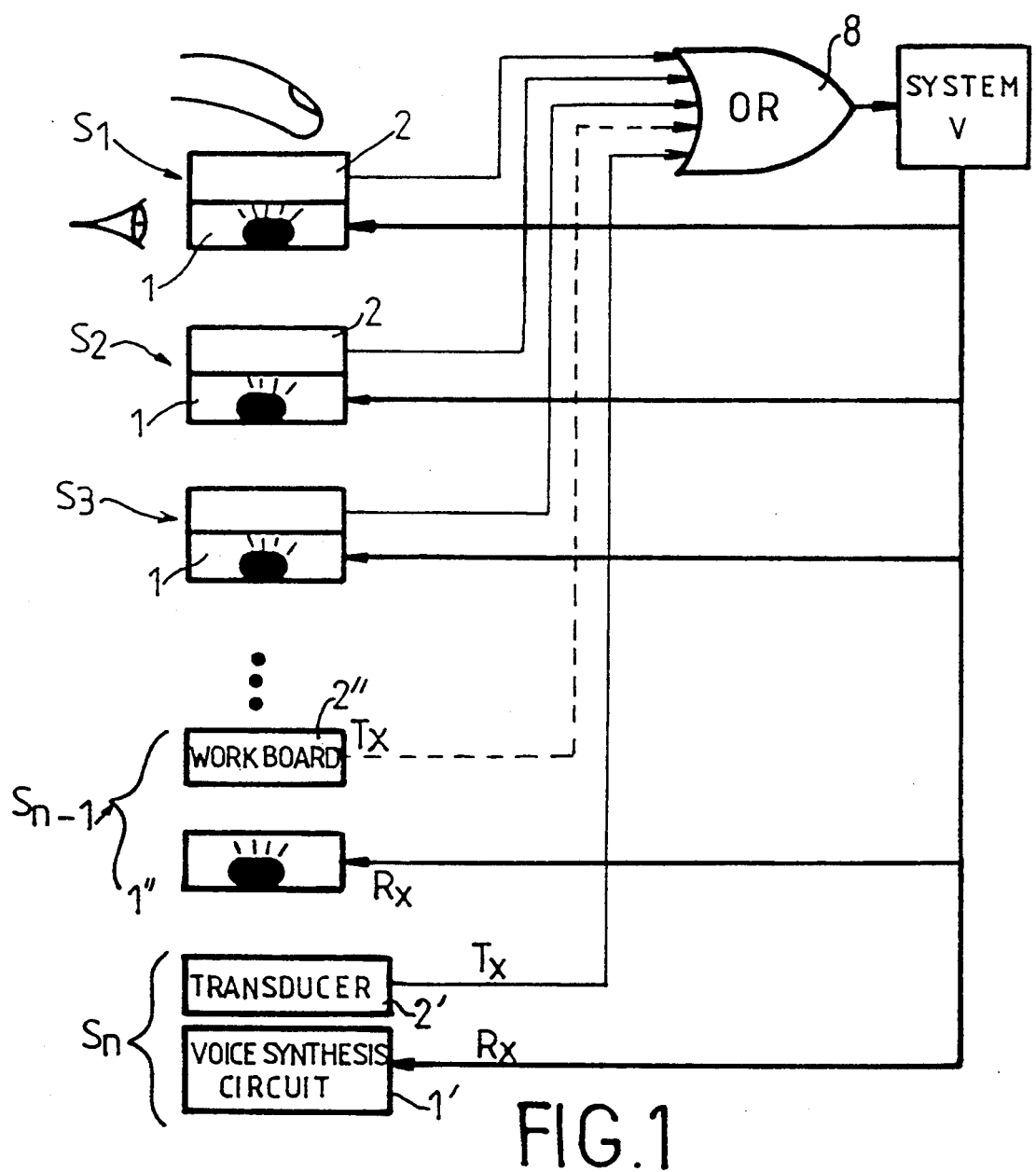
FIG. 1 is a schematic representation illustrating the principle of a command system embodying the invention, enabling one of the systems of an aircraft to be accessed.

The command system represented in FIG. 1 uses a plurality of command sources S1, S2, S3, ... Sn, each of the sources S1, S2 and S3 comprising a display unit 1 covered by a transparent keyboard 2 comprising a multiplicity of touch-sensitive areas organized e.g. in matrix form. The command system could of course comprise command sources Sn-1, Sn of different types such as e.g. a vocal command source Sn, comprising a transducer 2, (analogous to keyboard 2) associated with a voice synthesis circuit 1.

The luminous pattern generated by the display unit, and visible through the transparent keyboard, can serve to present information and/or to delimit command areas e.g. similar to conventional keys on which functions can be indicated.

By means of this structure, the sources S1, S2, S3, ... Sn are reconfigurable, i.e. the areas reserved for display purposes, the command areas and the functions indicated on these areas can be modified from one configuration to another, each configuration being specific to a system.

Figure 2:
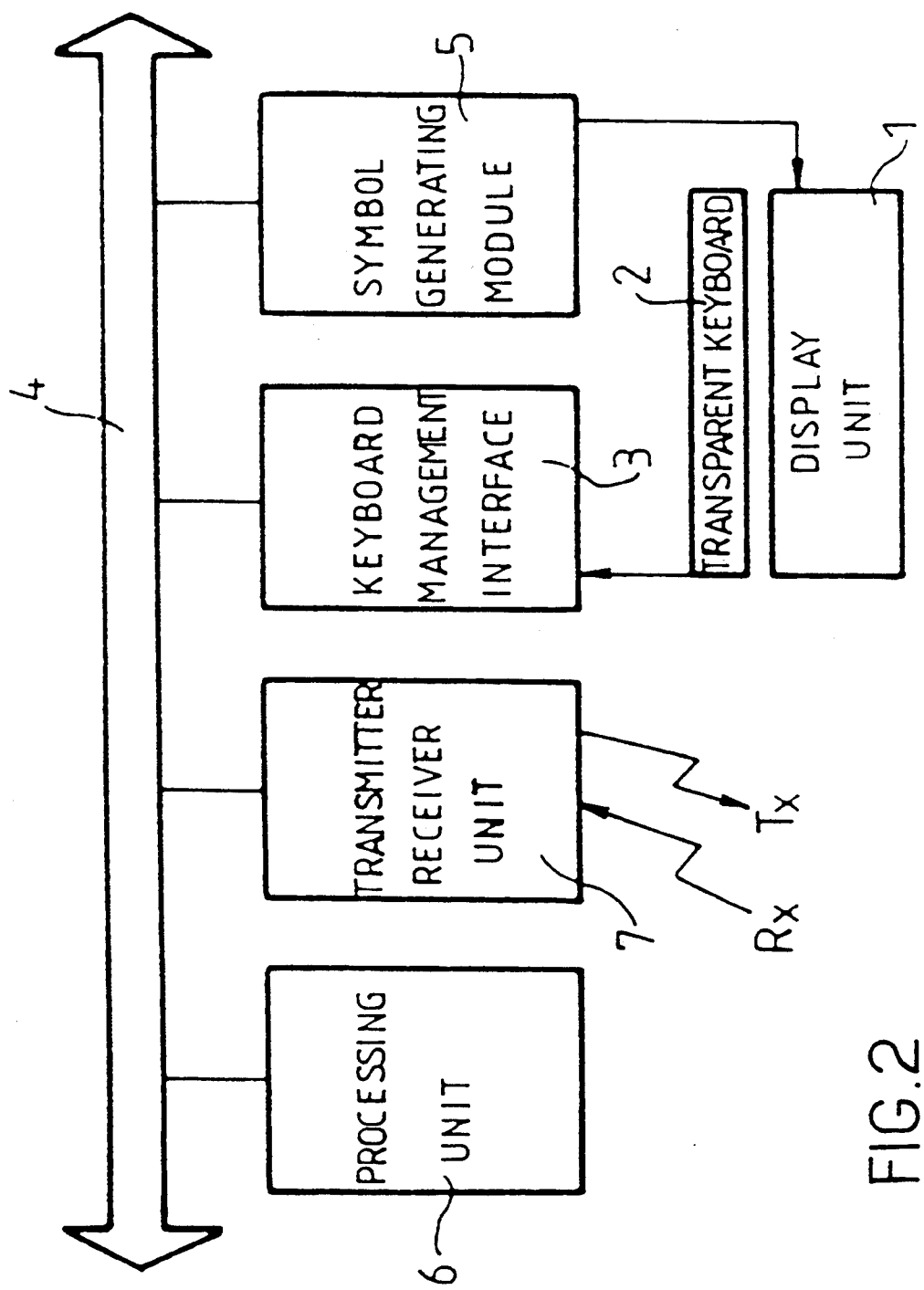
FIG. 2 is a schematic diagram of an example of the hardware architecture of one of the sources S1, S2, S3, ... Sn of the command system .illustrated in figure 1, in this instance a touch-sensitive keyboard, it being understood that equivalent diagrams of the sources S1 ... Sn are possible for other types of sources such as vocal commands, touch-sensitive work board possibly with remote display, etc.

In the example represented in FIG. 2, the transparent keyboard 2 is connected to a keyboard management interface 3, which in turn is connected to a communications bus 4.

The display unit 1 is connected to a symbol generating module 5 which is also connected to the bus 4.

Figure 3:
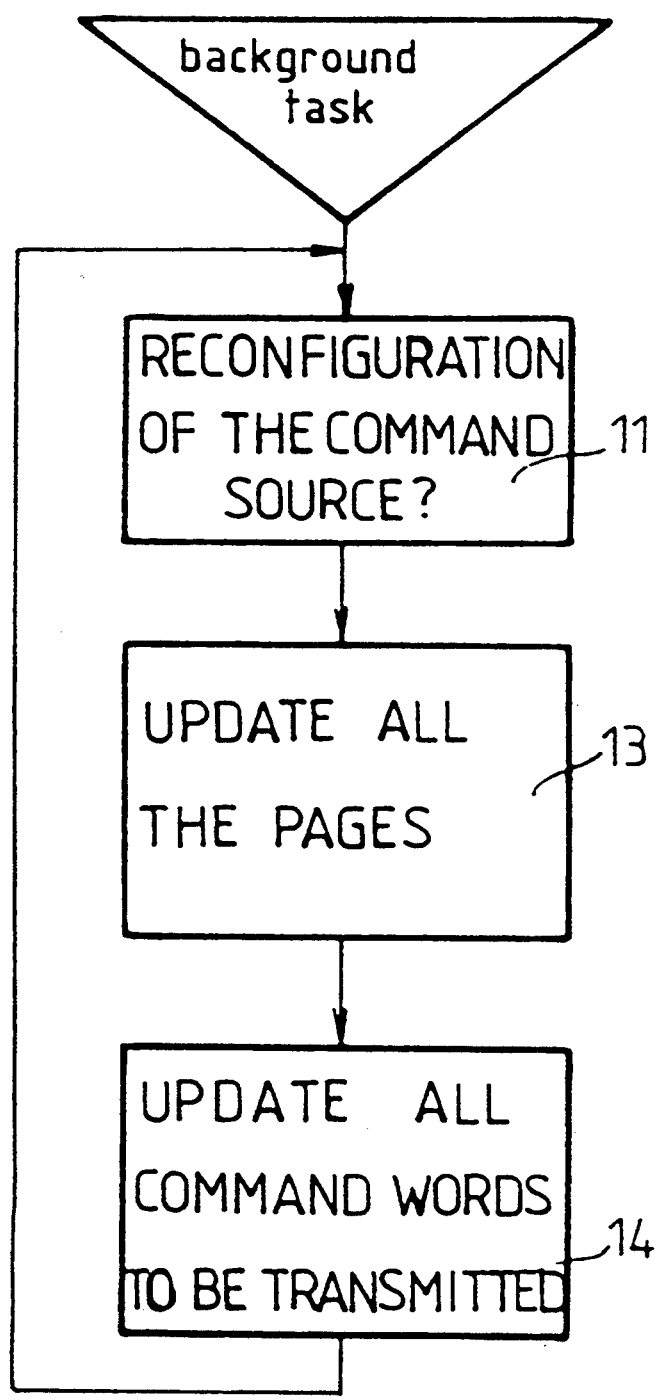
FIGS. 3 and 4 are flow charts illustrating the configuration mode of the command sources in the case of a command source of the reconfigurable keyboard type.
Figure 4:
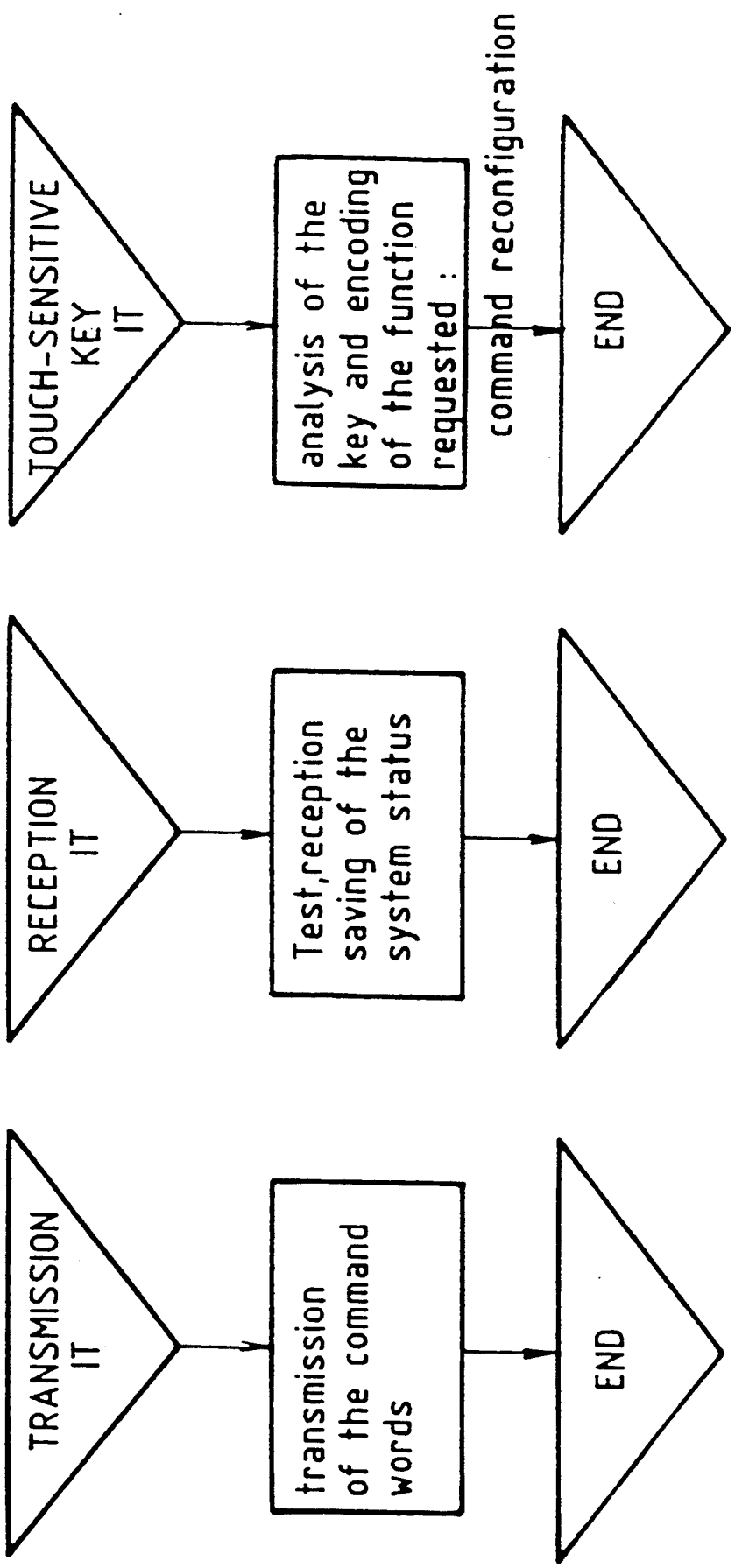

Of course, on the communications bus 4 are also connected a processing unit 6 which performs the processing sequences such as those illustrated in FIGS. 3 and 4, and a transmitter/receiver unit 7 which enables communication with the commanded aircraft system V through transmission lines Tx and reception lines Rx.

As previously mentioned, the command sources S1, S2, S3, ... Sn are interactive with one another. Each of these sources can send commands to an aircraft system through a transceiver such as the unit 7.

In the representation mode used in FIG. 1, the information generated by the sources S1, S2, S3, ... Sn is applied to the inputs of an OR gate 8 whose output is connected to the system for commanding a variable of the system V selected by source S1 which is solicited by an operator's finger.

The aircraft system which receives a command message executes this command and then returns an information, in the form of a status word, concerning its new status, to all the command sources S1, S2, S3, ... Sn for the purposes of updating them.

This updating entails a modification of the display produced by the command sources S1, S2, S3, ... Sn only if the latter are situated in a configuration in which the new status vector of the commanded system is visualized.

Otherwise, the updating is performed blindly, i.e. only in the memories in which the information concerning the different configurations of these sources is stored.

In this example, each keyboard can generate two types of commands, i.e.

commands to reconfigurate the keyboard that the pilot uses to access an aircraft system command and to obtain the appropriate keyboard configuration for this system;

for each of the above-mentioned configurations, commands of the commanded aircraft system.

In fact, a command (e.g. pressing of a key on the keyboard) triggers the processing associated with this command. This processing can be e.g. a change of keyboard configuration or the transmission of a command word to the commanded system.

More precisely, a command (e.g. pressing of a key on the keyboard) causes an interruption (touch-sensitive IT, FIG. 4) of the background task (block 10) performed by the processing unit of the command means.

During this interruption, the processing unit of the command means proceeds to analyze the command and encode the function requested.

It is during the background task that the processing unit of the command means then carries out a test (block 11) to determine whether the function requested is a reconfiguration of the command source.

If so, the processing unit of the command means carries out the reconfiguration requested and modifies the display (if any) associated with this command means.

Then, the processing unit of the command means proceeds to update all the pages stored as a function of the aircraft system status (block 13), then all the command words to be transmitted (block 14).

The background task (block 10) of the system can further be interrupted by:

the transmission cycles of the command words to the commanded aircraft systems (transmission IT, FIG. 4), and the reception of the system status word (reception IT, FIG. 4).

It is recalled that the reception of a system status word causes the system display to be updated on all command sources situated in the configuration corresponding to this system and blindly for the command sources momentarily in another configuration.

Of course, the invention is not limited to the embodiment previously described.

The command sources could thus consist in:

vocal commands using voice synthesis, the objective being to use natural language as much as possible to generate commands and to solicit the operator as little as possible, touch-sensitive work boards 2" enabling the restitution of the position of a finger placed on an inert surface, said touch-sensitive work board can be possibly associated with a screen 1" situated remotely from the work board 2" to provide visual feedback to the operator, conventional command means such as those commonly used on a Flight control unit type panel which comprises mode activation buttons, digital value selectors, instruction value displays.

We claim:

1. A command device comprising a plurality of interactive command sources enabling any number of heterogeneous systems to be accessed, wherein each command source has a configuration and is reconfigurable according to a plurality of configurations associated respectively to said heterogeneous systems, each command source comprising a means for introducing commands of a first type for configuring said command source according to a configuration associated with one of said systems, and commands of a second type specific to each of said configurations and therefore to each of said systems enabling the transmission of command messages to the system concerned, and wherein each system comprises means for transmitting just after an execution of a command of said first or second types, information relating to a status of the system for updating a system status display, perceptibly on the command sources situated in the configuration corresponding to said executed command, and blindly in memory spaces allocated to the command sources situated in other configurations.

2. The device as claimed in claim 1, wherein the command sources consist in transparent touch-sensitive keyboards placed on a reconfigurable display unit.

3. The device as claimed in claim 1, wherein said command sources consist in vocal commands using voice synthesis.

4. The device as claimed in claim 1, wherein said command sources are touch-sensitive work boards associated with remote display units.

5. The device as claimed in claim 1, wherein said command sources are of a conventional type and comprise mode activation buttons, digital value selectors, and instruction value displays.

6. The device as claimed in claim 1, wherein said command sources communicate with each of said systems by means of transmission and reception lines.

7. The device as claimed in claim 1, wherein each of said command sources comprises a display unit and a processing unit executing a background task which is interrupted when a command is applied to said command source, said processing unit conducting during an interruption of the background task a test to determine whether the command applied to the command source is of the first type and, if so, carries out the reconfiguration requested by modifying a display on said display unit, then updates all pages stored in said processing unit as a function of the status of the system associated with the requested configuration, then all the commands of the second type specific to said requested configuration.

8. The device as claimed in claim 1, wherein the information serving for updating the system status display is transmitted by this system in the form of a status word.

* * * * *